US012158233B2

(12) United States Patent
Spitz (10) Patent No.: US 12,158,233 B2
(45) Date of Patent: Dec. 3, 2024

(54) INSULATED FLUID FLOW BLOCK (71) Applicant: AKER SOLUTIONS AS, Lysaker (NO)

(72) Inventor: Stuart Spitz, Granada (ES)

(73) Assignee: AKER SOLUTIONS AS, Lysaker (NO)

( * ) Notice: Subject to any disclaimer, the term of this patent is extended or adjusted under 35 U.S.C. 154(b) by 0 days.

(21) Appl. No.: 18/277,773

(22) PCT Filed: Feb. 22, 2022

(86) PCT No.: PCT/NO2022/050048
§ 371 (c)(1),
(2) Date: Aug. 18, 2023

(87) PCT Pub. No.: WO2022/182245
PCT Pub. Date: Sep. 1, 2022

(65) Prior Publication Data
US 2024/0263731 A1      Aug. 8, 2024

(30) Foreign Application Priority Data

Feb. 23, 2021   (GB) .................................... 2102539

(51) Int. Cl.
*F16L 59/147*    (2006.01)
*E21B 33/03*     (2006.01)
(52) U.S. Cl.
CPC ............. *F16L 59/147* (2013.01); *E21B 33/03* (2013.01)
(58) Field of Classification Search
CPC .......... E21B 33/03; F16L 59/147; F16L 59/14

USPC .................................................... 138/98, 149
See application file for complete search history.

(56) References Cited

U.S. PATENT DOCUMENTS

| 1,891,290 A | * | 12/1932 | Tessky | ..................... | B23B 13/08 |
| | | | | | 226/102 |
| 4,048,352 A | * | 9/1977 | Pignocco | ................. | C23C 24/00 |
| | | | | | 427/232 |
| 4,121,193 A | | 10/1978 | Denison | | |
| 4,205,047 A | * | 5/1980 | Thubeauville | ......... | F16L 59/147 |
| | | | | | 220/560.05 |
| 4,363,504 A | * | 12/1982 | De Feo | .................... | F16L 59/21 |
| | | | | | 285/133.11 |

(Continued)

FOREIGN PATENT DOCUMENTS

GB      2578806 A      5/2020

*Primary Examiner* — Patrick F Brinson
(74) *Attorney, Agent, or Firm* — Norman B. Thot (57) ABSTRACT

A fluid flow apparatus includes a body and an insulation system. The body has an exterior surface having a passage extending therethrough from a first to a second portion. The passage has first and second end portions adjacent to the first and second portions, respectively, and an intermediate portion extending between the first and second end portions. A cross-sectional area of the intermediate portion is larger than that of the first and second end portions. The insulation system has an outer and an inner liner. The outer and inner liners are arranged in the passage to engage with the body so as to line the passage and to provide a barrier between the body and a fluid flowing along the passage. The outer liner thereby engages with the body, and the inner liner is partially enclosed by the outer liner and the body at the first and second end portions.

12 Claims, 4 Drawing Sheets

(56) References Cited

U.S. PATENT DOCUMENTS

| | | | |
|---|---|---|---|
| 4,600,038 A * | 7/1986 | Matsui | F02F 7/0087 |
| | | | 138/140 |
| 4,684,155 A * | 8/1987 | Davis | B65G 53/523 |
| | | | 138/DIG. 6 |
| 4,930,546 A * | 6/1990 | Kawamura | F16L 59/143 |
| | | | 138/149 |
| 6,679,294 B1 * | 1/2004 | Ringelberg | F16L 59/141 |
| | | | 62/50.7 |
| 7,762,824 B2 | 7/2010 | Smith, III | |
| 11,639,766 B2 * | 5/2023 | Fripp | F16L 55/163 |
| | | | 138/98 |

* cited by examiner

INSULATED FLUID FLOW BLOCK

CROSS REFERENCE TO PRIOR APPLICATIONS

This application is a U.S. National Phase application under 35 U.S.C. § 371 of International Application No. PCT/NO2022/050048, filed on Feb. 22, 2022 and which claims benefit to Great Britain Patent Application No. 2102539.0, filed on Feb. 23, 2021. The International Application was published in English on Sep. 1, 2022 as WO 2022/182245 A1 under PCT Article 21(2).

FIELD

The present invention relates to an insulated fluid flow block such as a valve block, a Christmas tree or other manifold suitable for controlling the flow of a fluid from a completed oil or gas well.

BACKGROUND

Flow of oil and/or gas from a well is controlled, in part, using a metallic assembly of valves, spools and fittings known as a Christmas tree. The Christmas tree is mounted on top of the wellhead or a completed well, and whilst its primary function is to control flow into or out of the well, it also has many other functions, including providing ports for the injection of chemicals into the well (chemical injection ports), pressure relief valves for relieving pressure in the well, and connections to sensors for monitoring conditions in the well such as pressure, temperature, flow rate, fluid composition etc. It also provides valves which are operable to shut-in the well in the event of an emergency.

The Christmas tree has a main passage a first end of which is connected to the production tubing, and a second end of which is connected to the production flowline, so that well fluid flows from the production tubing along the main passage of the Christmas tree to the production flowline. The production tubing is suspended from a tubing hanger which may be mounted in the well head as is typical in a vertical Christmas tree, or in the main passage of the Christmas tree, as is known in horizontal Christmas trees.

SUMMARY

An aspect of the present invention is to provide an improved configuration of fluid flow block such as a valve, Christmas tree or other manifold.

In an embodiment, the present invention provides a fluid flow apparatus which includes a body and an insulation system. The body has an exterior surface through which is provided a passage which extends from a first portion of the exterior surface of the body to a second portion of the exterior surface of the body. The passage has a first end portion which is adjacent to the first portion of the exterior surface of the body, a second end portion which is adjacent to the second portion of the exterior surface of the body, and an intermediate portion which extends between the first end portion and the second end portion. The intermediate portion has a cross-sectional area which is larger than a cross-sectional area of each of the first end portion and of the second end portion. The insulation system comprises an outer liner and an inner liner. The inner liner is separate from the outer liner. The outer liner and the inner liner are arranged in the passage to engage with the body so as to line the passage and to provide a barrier between the body and a fluid flowing along the passage. The outer liner engages with the body in the intermediate portion of the passage. The inner liner is partially enclosed by the outer liner and engages with an interior surface of the outer liner and the body at the first end portion and at the second end portion of the passage.

BRIEF DESCRIPTION OF THE DRAWINGS

The present invention is described in greater detail below on the basis of embodiments and of the drawings in which.

DETAILED DESCRIPTION

The present invention provides a fluid flow apparatus comprising a body having an exterior surface and through which is provided a passage which extends from a first portion of the exterior surface of the body to a second portion of the exterior surface of the body, the passage having first and second end portions adjacent the first and second portions of the exterior surface of the body respectively and an intermediate portion which extends between the first end and the second end, the intermediate portion having a larger cross-sectional area than the first and second end portions, the apparatus further including an insulation system which comprises an outer liner and a separate inner liner which are located in the passage to engage with the body so as to line the passage and provide a barrier between the body and fluid flowing along the passage, the outer liner engaging with the body in the intermediate portion of the passage, and the inner liner being partially enclosed by the outer liner and engaging with an interior surface of the outer liner and the body at the first and second end portions of the passage.

Where the passage in the fluid flow apparatus is supplied with fluid from a wellbore (because the fluid flow apparatus is, for example, a Christmas tree), the well fluid entering the passage of the apparatus can be at a relatively high temperature, and can heat up the assembly to such an extent that any sensors or hydraulic, electrical and fiber-optic equipment associated with the apparatus must be rated to operate at a temperature at or close to well-flowing temperature. This can be challenging, in particular in relation to electrical and fiber-optical couplers between the Christmas tree and tubing hanger. This heat loss to the fluid flow apparatus would also cause the well fluid to drop in temperature, and this could encourage the undesirable formation of wax or hydrates in the fluid flow apparatus.

By virtue of providing one or more portions of the main passage with a thermally insulating liner, the temperatures to which thermally sensitive electrical, fiber-optical or hydraulic components in the assembly are exposed, and the cooling of the well fluid, may be reduced.

The outer and inner liners are advantageously made from insulating materials that have a lower thermal conductivity than the material from which the body is made. The body made, for example, be metallic, and the liners made from a polymer such as polyether ether ketone (PEEK).

The outer liner is advantageously split longitudinally into three or more parts which when put together form a tube.

The apparatus may further include a connector which is provided with a fluid flow passage and which is secured to the first portion of the exterior surface of the body so that the passage in the body is aligned with the passage in the connector, the passage in the connector being sized and/or shaped so that a portion of the connector overhangs the edge of the body at the first end of the passage.

The apparatus may further include a second connector which is provided with a fluid flow passage and which is secured to the second portion of the exterior surface of the body so that the passage in the body is aligned with the passage in the second connector, the passage in the second connector being sized and/or shaped so that a portion of the second connector overhangs the edge of the body at the second end of the passage.

The passages in the body and the connector or one or both of the connectors may, for example, be generally cylindrical, the diameter of the passage in the connector being less than the diameter of passage in the body.

By virtue of this arrangement, engagement of the one or both of the ends of the inner liner with one or both of the connectors may restrict movement of the inner liner inside the passage without the need to provide means to secure the inner liner to the body.

The fluid flow apparatus may comprise a valve block, a Christmas tree or a valve manifold.

The first portion of the exterior surface of the body may be generally parallel to the second portion of the exterior surface of the body. The passage in the body may be substantially straight in this case.

The first portion of the exterior surface of the body may alternatively be angled relative to the second portion of the exterior surface of the body. The passage in the body may in this case not be straight, having a first portion which comprises the first end thereof and a second portion which comprises the second end thereof. The passage in the body may, for example, be generally L-shaped, the first portion extending generally perpendicular to the second portion.

The intermediate portion of the passage may in this case comprise a first intermediate portion which extends from the first end portion of the passage, and a second intermediate portion which extends from the second end portion of the passage, the insulation system comprising a first outer liner and a first inner liner which are located in the first portion of the passage to engage with the body so as to line the passage and to provide a barrier between the body and fluid flowing along the first portion of the passage, the first outer liner engaging with the body in the first intermediate portion of the passage, and the first inner liner being partially enclosed by the first outer liner and engaging with an interior surface of the first outer liner and the body at the first end of the passage, the insulation system further comprising second outer liner and a second inner liner which are located in the second portion of the passage to engage with the body so as to line the passage and provide a barrier between the body and fluid flowing along the second portion of the passage, the second outer liner engaging with the body in the second intermediate portion of the passage, and the second inner liner being partially enclosed by the second outer liner and engaging with an interior surface of the second outer liner and the body at the second end of the passage.

The first outer and inner liners may be provided with apertures which are positioned to align with each other, and with the intersection between the first intermediate portion and the second intermediate portion of the passage and the second inner liner being configured so that it extends through these apertures.

Embodiments of the present invention will now be described, by way of example only, and with reference to the attached drawings.

Figure 1:
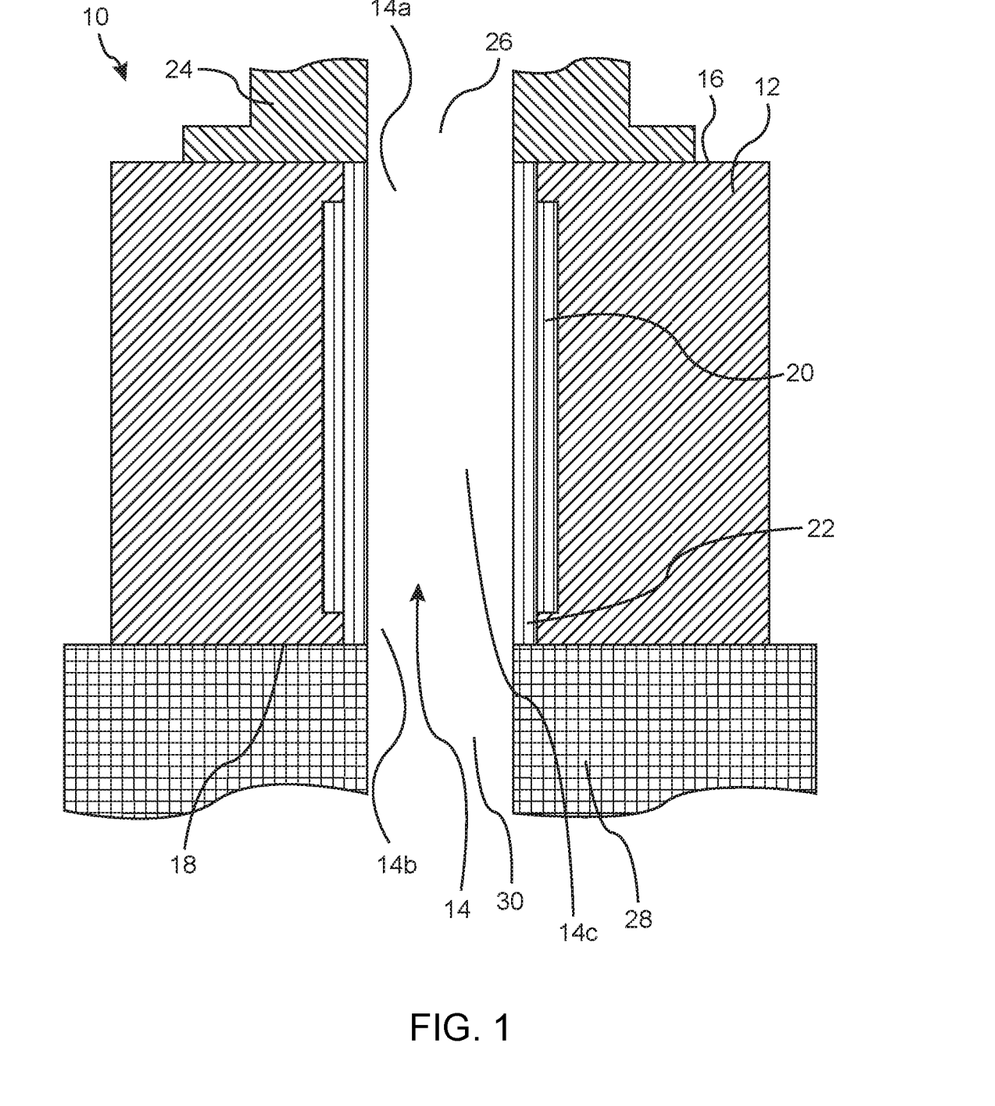
FIG. 1 shows a schematic illustration of a cross-section through a first embodiment of fluid flow apparatus according to the present invention.

Referring now to FIG. 1, there is shown a first embodiment of fluid flow apparatus 10 comprising a body 12 having an exterior surface and through which is provided a passage 14 which extends from a first portion 16 of the exterior surface of the body 12 to a second portion 18 of the exterior surface of the body 12. The passage 14 has first and second end portions 14a, 14b adjacent the first and second portions 16, 18 of the exterior surface of the body 12, respectively, and an intermediate portion 14c which extends between the first end portion 14a and the second end portion 14b, the intermediate portion 14c having a larger cross-sectional area than the first and second end portions 14a, 14b.

In this embodiment, the first portion 16 of the exterior surface of the body 12 is parallel to the second portion 18 of the exterior surface of the body 12, and the passage 14 is straight.

Also, in this embodiment, the passage 14 is generally cylindrical, i.e., has a generally circular transverse cross-section. It will be appreciated, however, that this need not be the case. The passage 14 may, for example, have an oval, square or rectangular transverse cross-section.

The fluid flow apparatus 10 further includes an insulation system which comprises an outer liner 20 and a separate inner liner 22 which are located in the passage 14 to engage with the body 12 so as to line the passage 14 and provide a barrier between the body 12 and fluid flowing along the passage 14. The outer liner 20 engages with the body 12 in the intermediate portion 14c of the passage 14. The inner liner 22 is partially enclosed by the outer liner 20 and engages with an interior surface of the outer liner 20 and the body 12 at the first and second end portions 14a. 14b of the passage 14.

The outer and inner liners 20, 22 are made from insulating materials that have a lower thermal conductivity than the material from which the body 12 is made. The body may be metallic and be made, for example, from stainless steel or a superalloy such as Inconel™ and the liners 20, 22 may be made from a polymer, glass or ceramic. The liners 20, 22 may, for example, be made from polyether etherketone (PEEK).

As mentioned above, in this embodiment, the passage 14 is generally cylindrical, the intermediate portion 14c of the passage 14 having a larger diameter than the first and second end portion portions 14a, 14b. The inner and outer liners 20, 22 are therefore cylindrical tubes, having an outer diameter and an inner diameter. It will be appreciated that in order to engage with the body 12 at the intermediate portion 14c of the passage 14, the outer diameter of the outer liner 20 must be greater than the diameter of the first and second end portions 14a. 14b of the passage 14. Thus, if the outer liner 20 is made a flexible, resilient material, it could be possible to compress it in a radially inward direction in order to insert it into the intermediate portion 14c of the passage 14, and then, when it is correctly located in the intermediate portion 14c, the outer liner 20 is allowed to expand to engage with the body 12. If the outer liner 20 were made from a single piece of a rigid material such as PEEK, it would not be possible to assemble the fluid flow apparatus by simply sliding the outer liner 20 into the passage 14. As such, in this embodiment, the outer liner 20 is split longitudinally into three or more parts which, when put together, form a cylindrical tube. The parts of the outer liner 20 can therefore be placed individually in the intermediate portion 14c of the passage 14 and assembled in situ to form the required tubular liner 20.

The inner liner 22 can then be slid into the passage 14, into the space enclosed by the outer liner 20, so that the outer liner 20 is trapped between the body 12 and the exterior surface of the inner liner 22, and is retained in its tubular configuration without the need for adhesive or any other fastening means.

In order to retain the inner liner 22 in this position, in this embodiment, the fluid flow apparatus 10 also includes a first connector 24 which is provided with a fluid flow passage 26 and which is secured to the first portion 16 of the exterior surface of the body 12 so that the passage 14 in the body 12 is aligned with the fluid flow passage 26 in the first connector 24. The fluid flow passage 26 in the first connector 24 is sized and shaped so that a portion of the first connector 24 overhangs the edge of the body 12 at the first end portion 14a of the passage 14.

In this embodiment, the fluid flow passage 26 in the first connector 24 is cylindrical and has a diameter which is slightly smaller than the diameter of the first end portion 14a of the passage 14 in the body 12, and substantially the same as the interior diameter of the inner liner 22.

The fluid flow apparatus 10 also includes a second connector 28 which is provided with a fluid flow passage 30 and which is secured to the second portion 18 of the exterior surface of the body 12 so that the passage 14 in the body 12 is aligned with the fluid flow passage 30 in the second connector 28. As with the first connector 24, the fluid flow passage 30 in the second connector 28 is sized and shaped so that a portion of the second connector 28 overhangs the edge of the body 12 at the second end portion 14b of the passage 14.

In this embodiment, the fluid flow passage 30 in the second connector 28 is cylindrical and has a diameter which slightly smaller than the diameter of the second end portion 14b of the passage 14 in the body 12, and substantially the same as the interior diameter of the inner liner 22.

By virtue of this arrangement, the inner liner 22 is trapped between the two connectors 24, 28, and engagement of the ends of the inner liner 22 with the connectors 24, 28 restricts movement of the inner liner 22 inside the passage 14 without the need to provide means to secure the inner liner 22 to the body 12.

One or both of the connectors 24, 28 may be a discrete connector, or may be a connector portion of a larger or more complex part, such as a flow spool, a tubing hanger, a Christmas tree, a manifold or the like. The connectors 24, 28 may be secured to the body 12 by any conventional means such as via a screw thread or a bolted flange connection.

Figure 2:
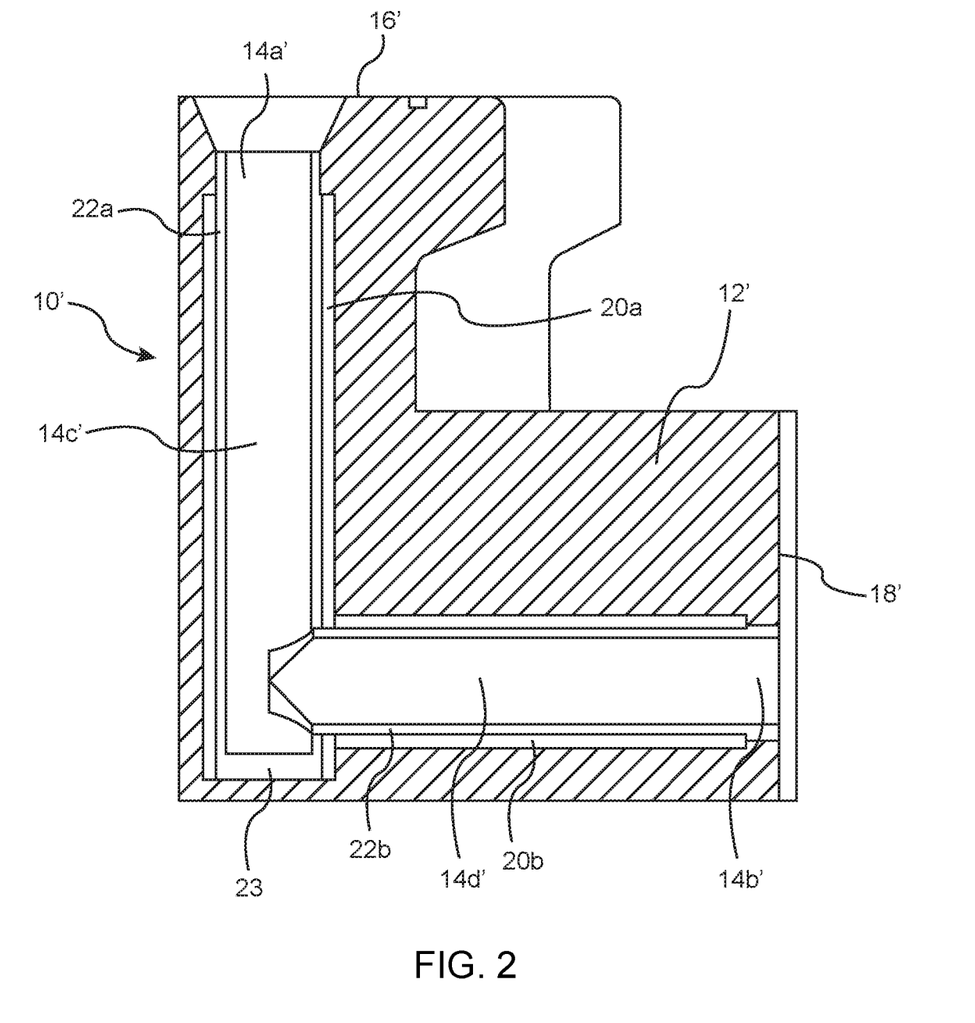
FIG. 2 shows a schematic illustration of a cross-section through a second embodiment of fluid flow apparatus according to the present invention.
Figure 3:
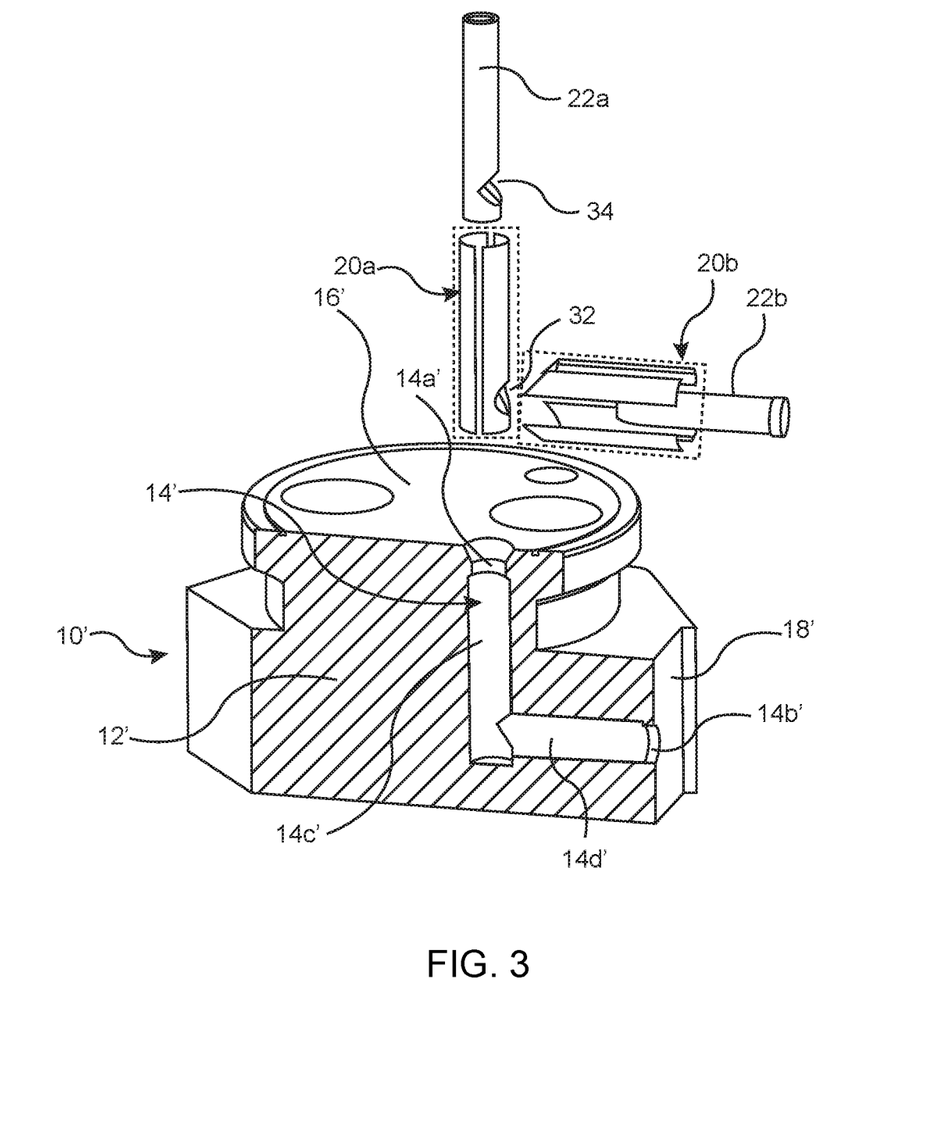
FIG. 3 shows a schematic illustration of an exploded view of the fluid flow apparatus illustrated in FIG. 2.

As mentioned above, in the embodiment illustrated in FIG. 1, the first portion 16 of the exterior surface of the body 12 is generally parallel to the second portion 18 of the exterior surface of the body 12. As such, the passage 14 in the body 12 is substantially straight. This need not be the case, however, and a second embodiment of fluid flow apparatus 10' according to the invention is illustrated in FIGS. 2 and 3 in which the first portion 16' of the exterior surface of the body 12' is generally perpendicular to the second portion 18', and the fluid flow passage 14' is generally L-shaped. The intermediate portion of the passage 14' therefore comprises a first intermediate portion 14c' which extends from the first end portion 14a' of the passage 14, and a second intermediate portion 14d' which extends from the second end portion 14b' of the passage 14', the first intermediate portion 14c' and second intermediate portion 14d' being generally perpendicular to one another, as illustrated in FIGS. 2 and 3.

As in the embodiment described above in relation to FIG. 1, the intermediate portions 14c', 14d' have a larger cross-sectional area than the first and second end portions 14a', 14b'. In this embodiment, all portions of the passage 14' also have a generally circular transverse cross-section.

In this embodiment, there are two tubular outer liners 20a and 20b, the first outer liner 20a lining the first intermediate portion 14c' of the passage 14', and the second outer liner 20b lining the second intermediate portion 14d' of the passage 14'. There are also two inner liners 22a, 22b, a first inner liner 22a which is enclosed by the first outer liner 20a, and a second inner liner 22b which is enclosed by the second outer liner 20b.

The inner and outer liners 20a, 20b, 22a, 22c are again all made from insulating materials that have a lower thermal conductivity than the material from which the body 12' is made. The body 12' may be metallic, for example, being made from stainless steel or a superalloy such as Inconel™, and the liners 20a, 20b, 22a, 22b may be made from a polymer, glass or ceramic. The liners 20a, 22a, 20b, 22b may, for example, be made from polyether etherketone (PEEK).

The inner and outer liners 20a, 20b, 22a, 22c are again cylindrical tubes, and in this embodiment, the outer liners 20a, 20b are split longitudinally into four portions, as illustrated in FIG. 3. To assemble the fluid flow apparatus 10', the parts of the first outer liner 20a are inserted into the first intermediate portion 14c' of the passage 14' via the first end portion 14a' of the passage 14', and then assembled in situ to form the tubular liner of the first intermediate portion 14c' of the passage 14. The first inner liner 22a is then slid into the first end portion 14a' of the passage 14' so that the first outer liner 20a is trapped between the body 12' and the exterior surface of the first inner liner 22a and retained in its tubular configuration without the need for adhesive or any other fastening means.

The second outer liner 20b can also be inserted into the passage 14', followed by the second inner liner 22b in the same way, but via the second end portion 14b' of the passage 14'.

The first inner liner 22a may be in the form of a tube which is closed at one end via a base 23. When the first inner liner 22a is inserted into the passage 14', the end with the base 23 is inserted first, so that the base 23 provides a lining for the passage 14' at the interior end of the first intermediate portion 14c' of the passage 14', as illustrated in FIG. 2.

In this embodiment, there are generally circular apertures 32, 34 provided in the first outer and inner liners 20a, 22a which are positioned to align with each other, and with the intersection between the first intermediate portion 14c' and the second intermediate portion 14d' of the passage 14' when the liners 20a, 22a are inserted in the passage 14'. The second inner liner 22b is configured so that when it is inserted into the passage 14' a first end of the second inner liner 22b extends through these circular apertures 32, 34. The second inner liner 22b thereby acts to retain the first inner and outer liners 20a, 22a in the passage 14'. This end of the second inner liner 22b is shaped so that it does not extend into the passage enclosed by the first inner liner 22a, and therefore does not impede the flow of fluid along the passage 14'.

The second inner liner 22b may be retained in the passage 14' by the engagement of a connector (not shown) to the second portion of the exterior surface 18' of the body 12', just as described in relation to FIG. 1 above. A connector may also be secured to the first portion 16' of the exterior surface of the body 12' to connect to the first end portion 14a' of the passage 14', but it will be appreciated that such a connector is not required to retain the first inner liner 22a in the passage 14'.

In the embodiment of the invention illustrated in FIG. 1 above, the inner diameter of the outer liner 20 is substantially the same as the diameter of the first and second end portions 14a, 14b of the passage. This is also the case for the first outer liner 20a of the embodiment illustrated in FIGS. 2 and 3; this has the same inner diameter as the first end portion 14a' of the passage 14'. The inner diameter of the second outer liner 20b is, however, slightly smaller than the diameter of the second end portion 14. The second inner liner 22b therefore has, at its second end, a slightly thickened portion, in which its outer diameter is slightly larger than the outer diameter of the remainder of the inner liner 22b. Engagement of this thickened portion with the end of the second outer liner 20b thus prevents the second inner liner 22b from being pushed too far into the passage 14 so that it encroaches on the space enclosed by the first inner liner 22a, and impedes fluid flow along the passage 14'.

The fluid flow apparatus may comprise a valve bock, a Christmas tree or a valve manifold. An example of the present invention implemented in a Christmas tree is illustrated schematically in FIG. 4. This shows a Christmas tree 100 mounted on a wellhead 120. The wellhead 120 has a main passage 140, and a tubing hanger 160 is mounted in the main passage 140 at the upper end of the wellhead 120. Production tubing 170 is suspended from the tubing hanger 160 and extends down into a wellbore (not shown) on which the wellhead 120 is provided. The tubing hanger 160 has a main body 180 which encloses a main passage 200 which provides a conduit for the flow of fluid from the wellhead 120 into the Christmas tree 100.

Figure 4:
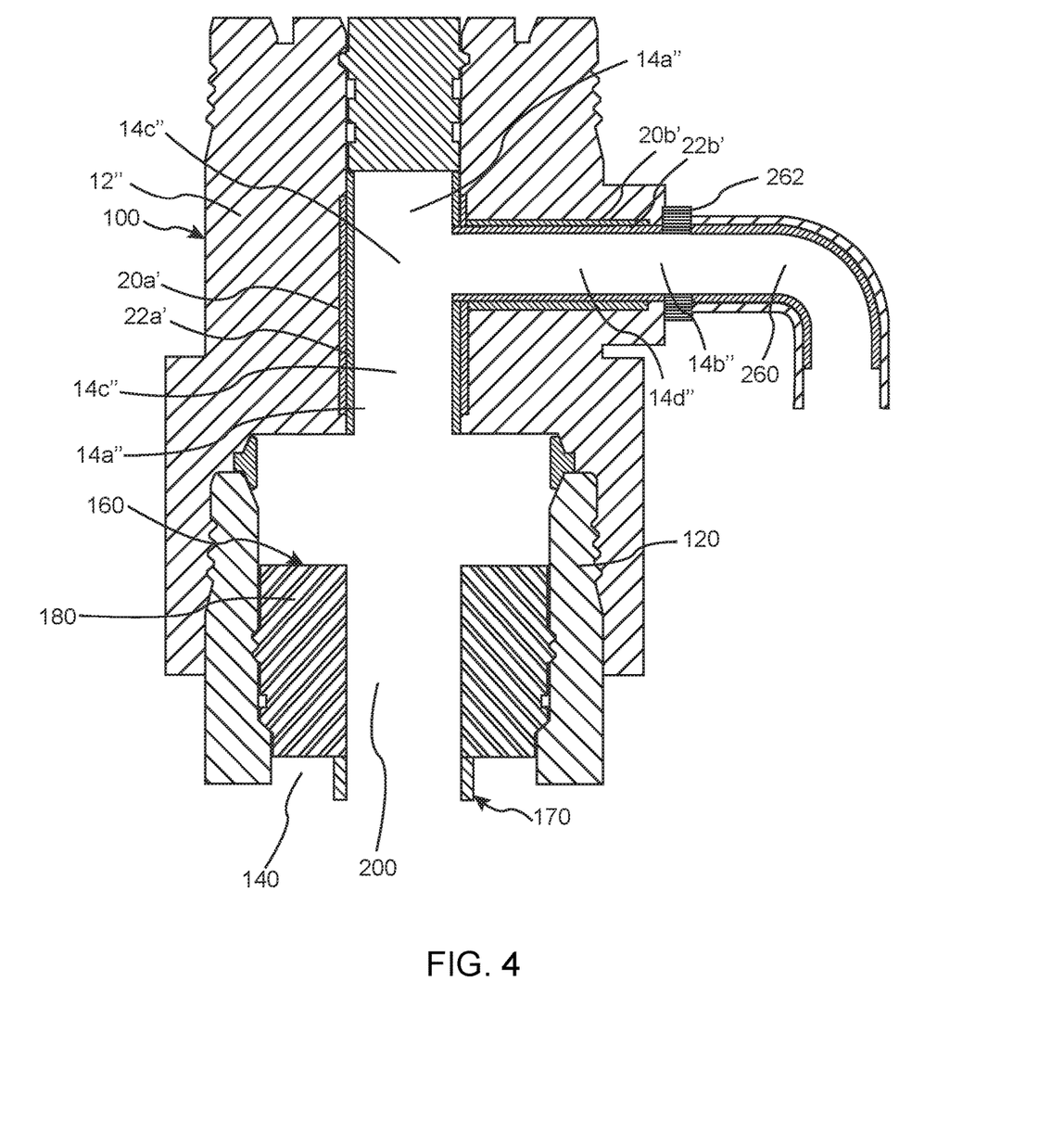
FIG. 4 shows a schematic illustration of a Christmas tree according to the present invention.

The Christmas tree 100 has a main body 12" which is secured at its lowermost end to the wellhead 120, and which encloses a passage 14", a first end portion 14a" which is connected to the main passage 200 in the tubing hanger 160, and a second end portion 14b" which is connected to a production flowline 260 via a connector 262. In this embodiment, the Christmas tree 100 is vertical Christmas tree, and the passage 14" comprises a first intermediate portion 14c" which extends from its first end portion 14a" generally parallel to the production tubing 170, and a second intermediate portion 14d" which extends generally perpendicular to the first intermediate portion 14c" to its second end portion 14b". The present invention could equally be applied to a horizontal Christmas tree in which the tubing hanger 160 is located within the Christmas tree 100 rather than within the wellhead 120.

Thermally insulating liners 20a', 22a', 20b', 22b' are provided to line the passage 14" in the Christmas tree 100 just as described in relation to FIGS. 2 and 3 above. The first outer and inner liners 20a', 22a' are again inserted first, and are retained in position by the second inner liner 22b'. The connector 262, via which the production flowline 260 is secured to the Christmas tree 100, holds the second inner liner 22b' in place as described in relation to FIGS. 1 to 3 above.

Where the passage 14, 14', 14" in the fluid flow apparatus 10, 10', 100 is supplied with fluid from a wellbore (for example, because the fluid flow apparatus is part of a Christmas tree as illustrated in FIG. 4), the well fluid entering the passage 14, 14', 14" of the fluid flow apparatus 10, 10', 100 can be at a relatively high temperature.

Conversely, the fluid flowing into the fluid flow apparatus 10, 10', 100 could be cold, for example, if a pressure drop causes the evaporation of a volatile liquid as or before it enters the fluid flow apparatus 10, 10', 100.

By virtue of its low thermal conductivity, the liners 20, 22, 20a, 22a, 20b, 22b, 20a', 22a', 20b', 22b' may reduce the transfer of heat between the well fluid and the fluid flow apparatus 10, 10', 100.

Such a heat transfer is undesirable for two reasons. First, it may expose electrical, fiber-optic or hydraulic components associated with the fluid flow apparatus 10, 10', 100 to temperatures they are not designed to tolerate, and as such, may cause these components to malfunction or be irreparably damaged, or said high-temperature exposure may limit life due to thermal degradation of materials.

Second, if the temperature of well fluid drops too much as a result of a heat transfer to the fluid flow apparatus 10, 10', 100, this may cause problems in relation to the processability of the well fluid. The flow of the well fluid along the production flowline 260 may, for example, be compromised by the increasing viscosity of the well fluid as it cools, or, where the well fluid is or contains natural gas, the temperature drop may cause condensation of water vapor in the gas, and the formation of hydrates, which could choke or block the passage 14, 14', 14" or production flowline 260. The liners 20, 22, 20a, 22a, 20b, 22b, 20a', 22a', 20b', 22b' may reduce the need to provide external insulation on the Christmas tree 100 or production flowline 260 to maintain the well fluid in a desired temperature range.

By providing an inner and an outer liner 20, 22, 20a, 22a, 20b, 22b, 20a', 22a', 20b', 22b', and locating the outer liner 20, 20a, 20b, 20a', 20b' in an enlarged intermediate portion of the passage 14, 14', 14", it is possible to provide the required thickness of insulation to achieve the desired reduction in heat transfer between the body 12, 12', 12" and the fluid flowing along the passage 14, 14', 14" without having to either significantly increase the diameter of the passage 14, 14', 14" (which may render it impossible to use the standard connectors normally used to connect to such a fluid flow apparatus 10, 10', 100) or significantly decrease the cross-sectional area of the passage 14, 14' 14" available for flow of fluid along the passage 14, 14', 14". It has been found, for example, that where the fluid flow apparatus is part of a Christmas tree 100, and the liners 20, 22, 20a, 22a, 20b, 22b, 20a', 22a', 20b', 22b' are made from PEEK, that 10 mm thick insulation may be required.

The first and second end portions 14a, 14b, 14a', 14b' of the passage 14, 14' can, for example, be sized so that they are only very slightly larger than the ends of the passage in a conventional equivalent fluid flow apparatus (so the normal connectors can be used), and the inner liner 22, 22a, 22b, 22a', 22b' is relatively thin, so that the cross-sectional area available for flow of fluid along the passage 14, 14', 14" is not reduced to any significant degree. The outer liner 20, 20a, 20, 20a', 20b' provides the required degree of thickness of insulation over the majority of the length of the passage 14, 14', 14".

By virtue of the arrangements described above, there is no need to provide any further means for securing the liners 20, 22, 20a, 22a, 20b, 22b, 20a', 22a', 20b', 22b' in the body 12, 12', 12" of the fluid flow apparatus 10, 10', 100. The liners 20, 22, 20a, 22a, 20b, 22b, 20a', 22a', 20b', 22b' are configured to engage with the body 12, 12', 12' in as tight a fit as possible. It will nevertheless be appreciated that it may not, in reality, be possible to provide complete contact over the entire length of the passage 14, 14', and that there may be small gaps between the liners 20, 22, 20a, 20b, 22a, 22b and the body 12, 12', 12" in places. In use, fluid flowing along the passage 14, 14', 14" could leak into the spaces between the liner and body 12, 12', 12" and potentially cause corrosion of the body 12, 12', 12".

To address this, it is possible to insert the liners 20, 22, 20a, 22a, 20b, 22b, 20a', 22a', 20b', 22b' when they are cold so that they expand when in place in the passage 14, 14', 14". It is additionally or alternatively possible to apply a viscous sealing fluid, such as an adhesive or resin, such as epoxy resin, to the body 12, 12', 12" inside the passage 14, 14', 14" before inserting the liners 20, 22, 20a, 22a, 20b, 22b, 20a', 22a', 20b', 22b' so that the sealing fluid fills any such gaps and prevents ingress of the fluid flowing along the passage 14, 14', 14" into these gaps.

The present invention is not limited to embodiments described herein; reference should be had to the appended claims.

LIST OF REFERENCE NUMERALS 10, 10' Fluid flow apparatus
12, 12', 12" Body
14, 14' Passage
14a, 14a', 14a" First end portion (of passage)
14b, 14b', 14b" Second end portion (of passage)
14c Intermediate portion
14c', 14c" First intermediate portion
14d', 14d" Second intermediate portion
16, 16' First portion (of exterior surface of the body)
18, 18' Second portion (of exterior surface of the body)
20 Outer liner
20a, 20a' First outer liner
20b, 20b' Second outer liner
22 Inner liner
22a, 22a' First inner liner
22b, 22b' Second inner liner
23 Base
24 First connector
26 Fluid flow passage
28 Second connector
30 Fluid flow passage
32 Circular aperture
34 Circular aperture
100 Fluid flow apparatus/Christmas tree
120 Wellhead
140 Main passage
160 Tubing hanger
170 Production tubing
180 Main body
200 Main passage
260 Production flowline
262 Connector

What is claimed is:

1. A fluid flow apparatus comprising a body having an exterior surface and through which is provided a passage which extends from a first portion of the exterior surface of the body to a second portion of the exterior surface of the body, the passage having first and second end portions adjacent the first and second portions of the exterior surface of the body, respectively, and an intermediate portion which extends between the first end and the second end, the intermediate portion having a larger cross-sectional area than the first and second end portions, the apparatus further including an insulation system which comprises an outer liner and a separate inner liner which are located in the passage to engage with the body so as to line the passage and provide a barrier between the body and fluid flowing along the passage, the outer liner engaging with the body in the intermediate portion of the passage, and the inner liner being partially enclosed by the outer liner and engaging with an interior surface of the outer liner and the body at the first and second end portions of the passage.

2. The fluid flow apparatus as recited in claim 1, wherein the outer liner and the inner liner are each made from insulating materials that have a lower thermal conductivity than a material from which the body is made.

3. The fluid flow apparatus as recited in claim 1, wherein the outer liner is split longitudinally into three or more parts which, when put together, form a tube.

4. The fluid flow apparatus as recited in claim 1, further comprising:
a first connector which is provided with a fluid flow passage and which is secured to the first portion of the exterior surface of the body so that the passage in the body is aligned with the fluid flow passage in the first connector, the fluid flow passage in the first connector being at least one of sized and shaped so that a portion of the first connector overhangs a first edge of the body at the first end portion of the passage.

5. The fluid flow apparatus as recited in claim 4, further comprising:
a second connector which is provided with a fluid flow passage and which is secured to the second portion of the exterior surface of the body so that the passage in the body is aligned with the fluid flow passage in the second connector, the fluid flow passage in the second connector being at least one of sized and shaped so that a portion of the second connector overhangs a second edge of the body at the second end portion of the passage.

6. The fluid flow apparatus as recited in claim 1, wherein the first portion of the exterior surface of the body is substantially parallel to the second portion of the exterior surface of the body.

7. The fluid flow apparatus as recited in claim 6, wherein the passage in the body is substantially straight.

8. The fluid flow apparatus as recited in claim 1, wherein the first portion of the exterior surface of the body is angled relative to the second portion of the exterior surface of the body.

9. The fluid flow apparatus as recited in claim 8, wherein,
the passage in the body is not straight, and
the body has a first portion which comprises the first end of the body, and a second portion which comprises the second end of the body.

10. The fluid flow apparatus as recited in claim 9, wherein the passage in the body is L-shaped so that the first portion of the body extends substantially perpendicular to the second portion of the body.

11. The fluid flow apparatus as recited in claim 9, wherein,
the intermediate portion of the passage comprises a first intermediate portion which extends from the first end portion of the passage, and a second intermediate portion which extends from the second end portion of the passage,
the outer liner of the insulation system is provided as a first outer liner and a second outer liner,
the inner liner of the insulation system is provided as a first inner liner and a second inner liner,
the first outer liner and the first inner liner are located in the first portion of the passage to engage with the body so as to line the passage and to provide a barrier between the body and the fluid flowing along the first portion of the passage, the first outer liner engages with the body in the first intermediate portion of the passage, the first inner liner is partially enclosed by the first outer liner and engages with an interior surface of the first outer liner and the body at the first end of the passage, the second outer liner and the second inner liner are located in the second portion of the passage to engage with the body so as to line the passage and to provide a barrier between the body and the fluid flowing along the second portion of the passage, the second outer liner engages with the body in the second intermediate portion of the passage, and the second inner liner is partially enclosed by the second outer liner and engages with an interior surface of the second outer liner and the body at the second end of the passage.

12. The fluid flow apparatus as recited in claim 11, wherein, the first outer liner and the first inner liner are each provided with an aperture which are positioned to align with each other, and an intersection between the first intermediate portion and the second intermediate portion of the passage and the second inner liner is configured to extend through each aperture.

* * * * *